US005950152A

United States Patent [19]

Arai et al.

[11] Patent Number: 5,950,152

[45] Date of Patent: Sep. 7, 1999

[54] METHOD OF CHANGING A PITCH OF A VCV PHONEME-CHAIN WAVEFORM AND APPARATUS OF SYNTHESIZING A SOUND FROM A SERIES OF VCV PHONEME-CHAIN WAVEFORMS

[75] Inventors: Yasuhiko Arai; Hirofumi Nishimura, both of Yokohama; Toshimitsu Minowa, Chigasaki; Ryou Mochizuki, Ayase; Takashi Honda, Tokyo, all of Japan

[73] Assignee: Matsushita Electric Industrial Co., Ltd., Osaka, Japan

[21] Appl. No.: 08/933,993

[22] Filed: Sep. 19, 1997

[30] Foreign Application Priority Data

Sep. 20, 1996 [JP] Japan .................................... 8-269146

[51] Int. Cl.$^{6}$ ........................................................ G01L 5/04

[52] U.S. Cl. ........................... 704/207; 704/200; 704/268

[58] Field of Search .................................... 704/207, 200, 704/205, 258, 267, 268

[56] References Cited

U.S. PATENT DOCUMENTS

| | | | |
|---|---|---|---|
| 5,617,507 | 4/1997 | Lee et al. | 704/200 |
| 5,682,502 | 10/1997 | Ohtsuka et al. | 704/267 |
| 5,715,368 | 2/1998 | Saito et al. | 704/268 |

FOREIGN PATENT DOCUMENTS

| | | |
|---|---|---|
| 1284898 | 11/1989 | Japan . |
| 4-125699 | 4/1992 | Japan . |
| 6250691 | 9/1994 | Japan . |
| 7319497 | 12/1995 | Japan . |
| 8-234793 | 9/1996 | Japan . |

OTHER PUBLICATIONS

Hirokawa T et al: "High Quality Speech Synthesis System Based on Waveform Concatenation of Phoneme Segment", IEICE Transactions on Fundamentals of Electronics, Communications and Computer Sciences, vol. 76A, No. 11, Nov. 1, 1993, pp. 1964–1970, XP000420615.

Narendranath M et al.: "Transformation of formants for voice conversion using artificial neural networks", Speech Communication, vol. 16, No. 2, Feb. 1995, p. 207–216 XP004024960.

*Primary Examiner*—David R. Hudspeth

*Assistant Examiner*—Susan Wieland

*Attorney, Agent, or Firm*—Lowe Hauptman Gopstein Gilman & Berner

[57] ABSTRACT

A composite pitch pattern of an artificial waveform of a composite sound indicating characters is produced according to a general pitch pattern producing model, and a pitch pattern of a VCV phoneme-chain waveform of each of VCV phoneme-chains corresponding to the characters is produced from an actual voice sample. Each VCV phoneme-chain composed of a preceding vowel, a consonant and a succeeding vowel has a pitch fine structure and a pitch fluctuation. Thereafter, an overall inclination of the pitch pattern of each VCV phoneme-chain waveform is adjusted to that of a portion of the composite pitch pattern corresponding to the-same VCV phoneme-chain to overlap transitional portions of preceding and succeeding vowels in a changed pitch pattern of each VCV phoneme-chain waveform with those in the corresponding portion of the composite pitch pattern. Therefore, when changed pitch patterns of the VCV phoneme-chain waveforms are connected with each other, a synthesized sound of the characters can be obtained while the synthesized sound maintains a pitch fine structure and a pitch fluctuation.

6 Claims, 4 Drawing Sheets

METHOD OF CHANGING A PITCH OF A VCV PHONEME-CHAIN WAVEFORM AND APPARATUS OF SYNTHESIZING A SOUND FROM A SERIES OF VCV PHONEME-CHAIN WAVEFORMS

BACKGROUND OF THE INVENTION

1. Field of the Invention

The present invention relates generally to a method of changing a pitch of a VCV (vowel-consonant-vowel) phoneme-chain waveform and an apparatus of synthesizing a sound by changing pitches of a plurality of VCV phoneme-chain waveforms and connecting the VCV phoneme-chain waveforms with each other, and more particularly to a pitch changing method in which a pitch of a VCV phoneme-chain waveform is changed while the VCV phoneme-chain waveform maintains a pitch fluctuation and a pitch fine structure and a sound synthesizing apparatus in which a sound is synthesized from a-series of VCV phoneme-chain waveforms while the VCV phoneme-chain waveforms of the sound maintain a pitch fluctuation and a pitch fine structure.

2. Description of the Related Art 2.1 Previously Proposed Art

FIG. 1 shows a composite pitch pattern P1 of a waveform of a phrase "Yokohama city" pronounced as "yo-ko-ha-ma-shi" in Japan, and FIGS. 2A to 2D show pitch patterns P2 to P5 of waveforms of a plurality of VCV (vowel-consonant-vowel) phoneme chains "(y)-o-k-o", "o-h-a", "a-m-a" and "a-sh-i" obtained by dividing a series of phonemes of the pronounced voice "yo-ko-ha-ma-shi".

When a plurality of characters "yokohamashi" written in a text is read in a conventional voice synthesizing apparatus, a character signal waveform indicating the pronunciation "yo-ko-ha-ma-shi" is artificially generated, the composite pitch pattern P1 of the waveform corresponding to the pronunciation "yo-ko-ha-ma-shi" is produced from the character signal waveform. Also, a large number of VCV phoneme-chain waveforms respectively extracted from an actual voice are stored in advance in a VCV phoneme-chain waveform storing unit of the conventional voice synthesizing apparatus, and waveforms inherent in a plurality of VCV phoneme chains "(y)-o-k-o", "o-h-a", "a-m-a" and "a-sh-i" corresponding to the input characters "yokohamashi" are read out from the storing unit. Here, a pitch frequency of one pitch pattern denotes a fundamental frequency of a sound including a voice. When the pitch frequency is high (or low), the sound is classified as a high-pitched (or low-pitched) sound. Also, a portion of the pitch pattern indicated by a dotted line in each of the pitched patterns P2, P3 and P5 indicates a waveform of a voiceless consonant such as "k" or "h". Also, a first portion P6 of the first phoneme "o" in the VCV phoneme-chain waveform "(y)-o-k-o" indicates a vowel transitional portion of the first phoneme "o", a second portion P7 of the second phoneme "o" in the VCV phoneme-chain waveforms "(y)-o-k-o" and "o-h-a" indicates a vowel transitional portion of the second phoneme "o", a portion P8 of the phoneme "a" all in the VCV phoneme-chain waveforms "o-h-a" and "a-m-a" indicates a vowel transitional portion of the phoneme "a", and a portion P9 of the phoneme "a" common in the VCV phoneme-chain waveforms "a-m-a" and "a-sh-i" indicates a vowel transitional portion of the phoneme "a".

In a conventional voice synthesizing method, because a pitch frequency at each vowel transitional portion is gradually changed, each pair of VCV phoneme-chain waveforms adjacent to each other are connected with each other at vowel transitional portions of a common vowel on condition that the common vowel is not either a vowel placed at the top of a word or a voiceless vowel, and a synthesized pitch pattern almost agreeing with the composite pitch pattern P1 is formed by connecting the pitch patterns P2 to P5 with each other while adjusting the pitch frequency of each pitch pattern P2 to P5.

The pitch pattern connection performed while adjusting the pitch frequency of each pitch pattern is described in detail with reference to FIGS. 3A and 3B.

FIG. 3A representatively shows a VCV phoneme-chain waveform placed in a plurality of time-periods.

As shown in FIG. 3A, in cases where a pitch pattern of the waveform of the pronunciation "yo-ko-ha-ma-shi" is, for example, synthesized, a plurality of impulse actuating time-points Pt are determined at a plurality of local peak points of one VCV phoneme-chain waveform for each of the VCV phoneme-chain waveforms "(y)-o-k-o", "o-h-a", "a-m-a" and "a-sh-i", a pair of time-periods adjacent to each other is determined for each impulse actuating time-point Pt, a pitch waveform is extracted from a waveform portion at one pair of time-periods around one impulse actuating time-point Pt for each impulse actuating time-point Pt by setting a hunning window to the waveform portion to decompose each VCV phoneme-chain waveform to a series of pitch waveforms (called a pitch waveform string). A representative pitch waveform is shown in FIG. 3B. Thereafter, the pitch waveform string of the VCV phoneme-chain waveform "(y)-o-k-o", the pitch waveform string of the VCV phoneme-chain waveform "o-h-a", the pitch waveform string of the VCV phoneme-chain waveform "a-m-a" and the pitch waveform string of the VCV phoneme-chain waveform "a-sh-i" are connected with each other in that order to arrange the pitch waveforms of the VCV phoneme-chain waveforms along the composite pitch pattern P1 while the vowel transitional portions P7 of the waveforms "(y)-o-k-o" and "o-h-a", the vowel transitional portions P8 of the waveforms "o-h-a" and "a-m-a" and the vowel transitional portions P9 of the waveforms "a-m-a" and "a-sh-i" are respectively overlapped. In this case, because a time interval between two pitch waveforms corresponds to a pitch frequency, the arrangement of the pitch waveforms of the VCV phoneme-chain waveforms along the composite pitch pattern P1 denotes that the time intervals of the pitch waveforms of the VCV phoneme-chain waveforms are adjusted to the pitch frequency of the composite pitch pattern P1. That is, a pitch of each VCV phoneme-chain waveform is changed to adjust a pitch frequency of each VCV phoneme-chain waveform to a pitch frequency of the composite pitch pattern P1.

2.2. Problems to be Solved by the Invention

However, in the above pitch changing method for the VCV phoneme-chain waveforms, because each VCV phoneme-chain waveform is decomposed to a plurality of pitch waveforms and the pitch waveforms are rearranged along the composite pitch pattern P1, a pitch fluctuation peculiar to a natural voice is disappeared. Here, the pitch fluctuation denotes a minute time fluctuation in a pitch frequency of a pitch pattern. For example, a time interval of two impulse actuation time-points adjacent to each other slightly changes with time in each VCV phoneme-chain waveform, and the slight change of the time interval between the impulse actuation time-points is lost by rearranging the pitch waveforms. Therefore, there is a drawback that the natural quality of a synthesized voice obtained in the conventional voice synthesizing apparatus is degraded.

Also, there is a case that a pitch frequency of a voiced consonant portion becomes slightly lower than that of a vowel portion in a VCV phoneme chain. For example, as shown in FIG. 1, a pitch frequency of the voiced consonant "m" in the pitch patter P4 is lower than that of the vowel "a". This pitch frequency change in a structure of a voice waveform is called a pitch fine structure. However, because the composite pitch pattern 1 is artificially generated, any pitch fine structure does not exist in the composite pitch pattern 1. Therefore, the composite pitch pattern 1 is called a general whole pitch pattern having no pitch fluctuation or no pitch fine structure. For example, a pitch frequency of the voiced consonant "m" is not lower than that of the vowel "a" in the composite pitch patter P1. Therefore, even though a pitch pattern of each VCV phoneme-chain waveform has a pitch fine structure, because each VCV phoneme-chain waveform is decomposed to a plurality of pitch waveforms and the pitch waveforms are rearranged along the composite pitch pattern P1, there is a drawback that the pitch fine structure is disappeared.

Also, though people can feel that a sound is high or low according to the fundamental frequency (or the pitch frequency) of the sound, people cannot feel a tone quality according to the pitch frequency. That is, the tone quality of a sound depends on a distribution of a plurality of higher harmonic waves included in the sound. In cases where the pitch frequency of a VCV phoneme-chain waveform is greatly changed to arrange the VCV phoneme-chain waveform along the composite pitch pattern P1, in other words, in cases where a pitch changing degree indicating a ratio of the pitch frequency of the composite pitch pattern P1 to the pitch frequency of the VCV phoneme-chain waveform is high, a balance between a wave of the fundamental frequency and the group of higher harmonic waves is greatly changed. Therefore, there is a drawback that the natural quality of a synthesized voice is lost and the tone quality of the synthesized voice is degraded.

SUMMARY OF THE INVENTION

A first object of the present invention is to provide, with due consideration to the drawbacks of such a conventional pitch changing method and a sound synthesizing apparatus, a pitch changing method of a VCV phoneme-chain waveform in which a pitch frequency of the VCV phoneme-chain waveform is changed while maintaining a pitch fluctuation of the VCV phoneme-chain waveform and a pitch fine structure of the VCV phoneme-chain waveform even though a pitch changing degree for the VCV phoneme-chain waveform is high.

Also, a second object of the present invention is to provide a sound synthesizing apparatus in which a sound having the natural quality and a high tone quality is synthesized from a plurality of VCV phoneme-chain waveforms by changing pitch frequencies of the VCV phoneme-chain waveforms and connecting the VCV phoneme-chain waveforms with each other while the sound maintains a pitch fluctuation and a pitch fine structure even though a pitch changing degree for each VCV phoneme-chain waveform is high.

The first object is achieved by the provision of a pitch changing method of a VCV phoneme-chain waveform, comprising the steps of:

producing a composite pitch pattern of an artificial waveform of a composite sound indicating characters written in a text, the composite pitch pattern being drawn in plane co-ordinates a of a pitch frequency and a time;

specifying a VCV phoneme-chain portion of the composite pitch pattern corresponding to a VCV phoneme chain composed of a preceding vowel, a consonant and a succeeding vowel;

producing a pitch pattern of a VCV phoneme-chain waveform of the VCV phoneme chain from an actual voice sample;

defining an inclination of a straight line connecting a transitional portion of the preceding vowel and a transitional portion of the succeeding vowel in the plane co-ordinates as an overall inclination of a pitch pattern of a waveform corresponding to the VCV phoneme chain;

changing a pitch of the VCV phoneme-chain waveform to form a changed pitch pattern of the VCV phoneme-chain waveform while making the overall inclination of the changed pitch pattern of the VCV phoneme-chain waveform agree with the overall inclination of the VCV phoneme-chain portion of the composite pitch pattern and overlapping the transitional portion of the preceding vowel in the changed pitch pattern of the VCV phoneme-chain waveform with that in the VCV phoneme-chain portion of the composite pitch pattern; and adopting the changed pitch pattern of the VCV phoneme-chain waveform as a pitch pattern of a waveform corresponding to the VCV phoneme chain.

In the above steps, when characters written in a text is input, a composite pitch pattern of an artificial waveform of a composite sound indicating the characters is produced, and a VCV phoneme-chain portion of the composite pitch pattern corresponding to a VCV phoneme chain is specified. The waveform of the composite sound is artificially formed, so that the composite sound lacks a pitch fine structure and a pitch fluctuation.

Also, a VCV phoneme-chain waveform corresponding to the same VCV phoneme chain is produced from an actual voice sample. Therefore, a pitch fine structure and a pitch fluctuation exist in the VCV phoneme-chain waveform.

Thereafter, a pitch of the VCV phoneme-chain waveform is changed to overlap a transitional portion of a preceding vowel in a pitch pattern of the VCV phoneme-chain waveform with that in the VCV phoneme-chain portion of the composite pitch pattern while making an overall inclination of the pitch pattern of the VCV phoneme-chain waveform agree with an overall inclination of the VCV phoneme-chain portion of the composite pitch pattern. Therefore, a changed pitch pattern of the VCV phoneme-chain waveform is obtained. Thereafter, the changed pitch pattern of the VCV phoneme-chain waveform is adopted as a pitch pattern of a waveform corresponding to the VCV phoneme chain.

Accordingly, even though a pitch changing degree for the VCV phoneme-chain waveform is high, a VCV phoneme-chain waveform corresponding to the VCV phoneme chain can be obtained while the VCV phoneme-chain waveform maintains a pitch fluctuation and a pitch fine structure.

Also, in cases where a plurality of changed pitch pattern of a plurality of VCV phoneme-chain waveforms of a synthesized sound indicating the characters written in the text are connected in series, the synthesized sound having the superior natural quality can be obtained.

The second object is achieved by the provision of a sound synthesizing apparatus comprising:

storing means for storing a large number of VCV phoneme-chain waveforms of VCV phoneme-chains produced from actual voice samples, each VCV phoneme-chain being composed of a preceding vowel, a consonant and a succeeding vowel;

receiving means for receiving characters written in a text;

VCV phoneme-chain determining means for determining a string of particular VCV phoneme-chains corresponding to the characters received by the receiving means;

composite pitch pattern producing means for producing a composite pitch pattern of an artificial waveform of a composite sound corresponding to the characters according to the string of particular VCV phoneme-chains determined by the VCV phoneme-chain determining means;

VCV phoneme-chain waveform selecting means for selecting a series of particular VCV phoneme-chain waveforms corresponding to the string of particular VCV phoneme-chains determined by the VCV phoneme-chain determining means from the VCV phoneme-chain waveforms stored in the storing means;

pitch changing means for changing a pitch of each particular VCV phoneme-chain waveform selected by the VCV phoneme-chain waveform selecting means to form a changed pitch pattern of the particular VCV phoneme-chain waveform while making an overall inclination of the changed pitch pattern of the particular VCV phoneme-chain waveform agree with an overall inclination of a portion of the composite pitch pattern produced by the composite pitch pattern producing means and overlapping a transitional portion of the preceding vowel in the changed pitch pattern of the particular VCV phoneme-chain waveform with that in the portion of the composite pitch pattern;

VCV phoneme-chain waveform connecting means for connecting the changed pitch patterns of the particular VCV phoneme-chain waveforms obtained by the pitch changing means with each other while overlapping a transitional portion of a succeeding vowel of a first particular VCV phoneme-chain waveform with a transitional portion of a preceding vowel of a second particular VCV phoneme-chain waveform following the first particular VCV phoneme-chain waveform for each particular VCV phoneme-chain waveform to produce a synthesized pitch pattern of a synthesized waveform of a synthesized sound; and synthesized sound outputting means for outputting the synthesized sound produced by the VCV phoneme-chain waveform connecting means.

In the above configuration, a string of particular VCV phoneme-chains corresponding to characters written in a text is determined, and a composite pitch pattern of an artificial waveform of a composite sound corresponding to the characters is produced according to the string of particular VCV phoneme-chains by the composite pitch pattern producing means. In this case, because the composite pitch pattern is artificially produced, the composite sound lacks a pitch fine structure and a pitch fluctuation.

Thereafter, a series of particular VCV phoneme-chain waveforms corresponding to the string of particular VCV phoneme-chains is selected from the VCV phoneme-chain waveforms by the VCV phoneme-chain waveform selecting means. Because each particular VCV phoneme-chain waveform is produced from an actual voice sample, the particular VCV phoneme-chain waveform has a pitch fine structure and a pitch fluctuation.

Thereafter, a pitch pattern of each particular VCV phoneme-chain waveform is changed according to the pitch changing method by the pitch changing means. Therefore, each particular VCV phoneme-chain waveform roughly overlapping with a corresponding portion of the composite pitch pattern of the composite sound while the particular VCV phoneme-chain waveform maintains the pitch fine structure and the pitch fluctuation.

Thereafter, the changed pitch patterns of the particular VCV phoneme-chain waveforms are connected with each other by the VCV phoneme-chain waveform connecting means to produce a synthesized pitch pattern of a synthesized waveform of a synthesized sound, and the synthesized sound is output.

Accordingly, even though a pitch changing degree for each particular VCV phoneme-chain waveform is high, a sound having the natural quality and a high tone quality is synthesized from the particular VCV phoneme-chain waveforms while the sound maintains a pitch fluctuation a pitch fine structure.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of a pitch changing method of a VCV phoneme-chain waveform and an apparatus of synthesizing a sound from a series of VCV phoneme-chain waveforms according to the present invention are described with reference to drawings.

A pitch changing method of a VCV phoneme-chain waveform is is described with reference to FIGS. 4 and 5.

Figures 1, 2A, 2B, 2C, 2D:
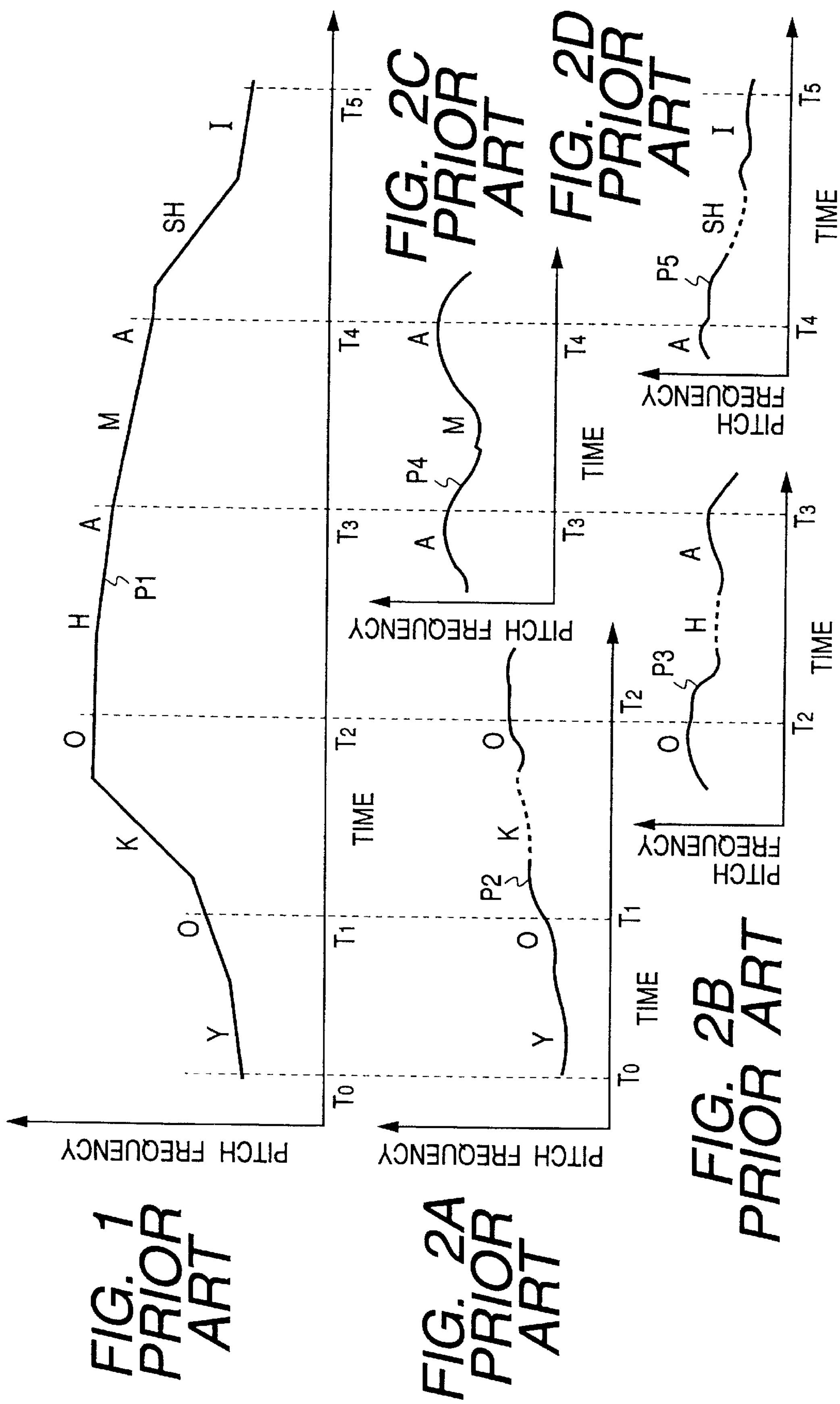
FIG. 1 PRIOR ART
FIG. 2A PRIOR ART
FIG. 2B PRIOR ART
FIG. 2C PRIOR ART
FIG. 2D PRIOR ART
FIG. 1 shows a composite pitch pattern P1 of a waveform of a phrase “Yokohama city” pronounced as “yo-ko-ha-ma-shi” in Japan.
FIGS. 2A to 2D show pitch patterns P2 to P5 of waveforms of a plurality of VCV (vowel-consonant-vowel) phoneme chains “(y)-o-k-o”, “o-h-a”, “a-m-a” and “a-sh-i” obtained by dividing a series of phonemes of the pronounced voice “yo-ko-ha-ma-shi”
Figure 3A:
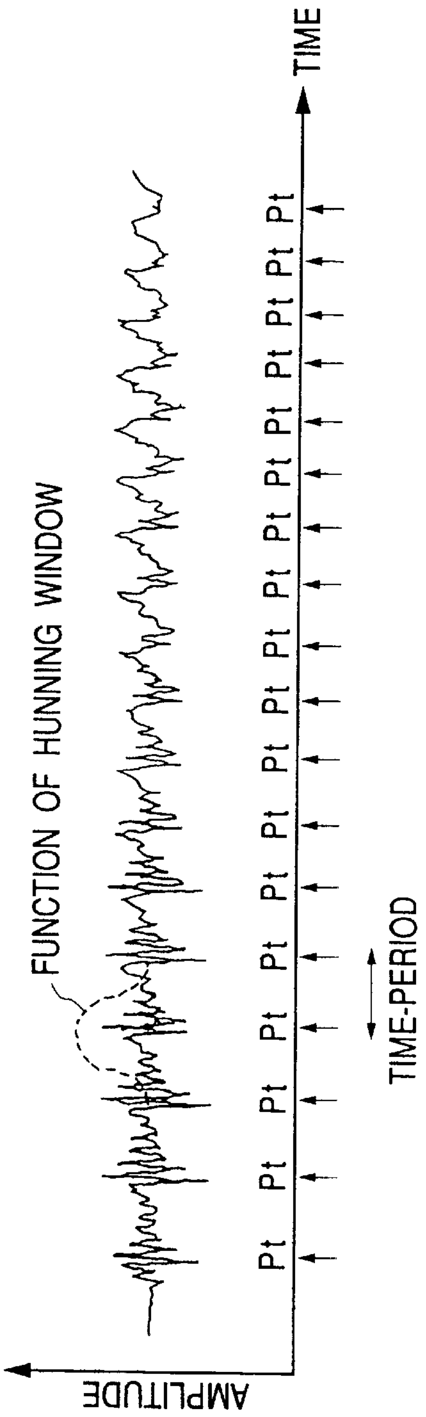
FIG. 3A PRIOR ART
FIG. 3A representatively shows a VCV phoneme-chain waveform placed in a plurality of time-periods.
Figure 3B:
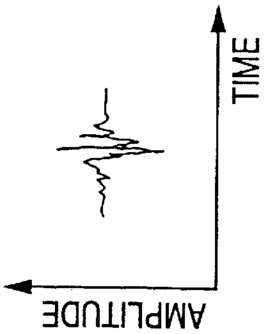
FIG. 3B PRIOR ART
FIG. 3B shows a representative pitch waveform extracted from the VCV phoneme-chain waveform shown in FIG. 3A.
Figure 4:
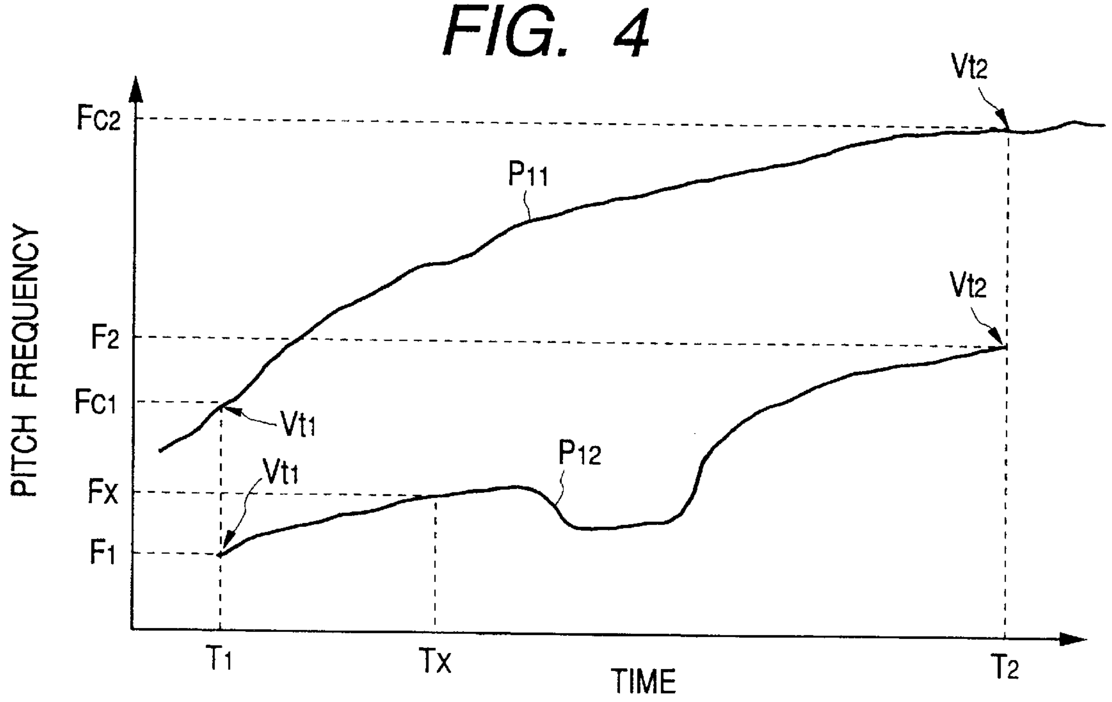
FIG. 4 shows a VCV phoneme-chain portion of a composite pitch pattern P11 of a composite sound used as a standard of a pitch pattern of a synthesized sound and a pitch pattern P12 inherent in a VCV phoneme-chain waveform.
Figure 5:
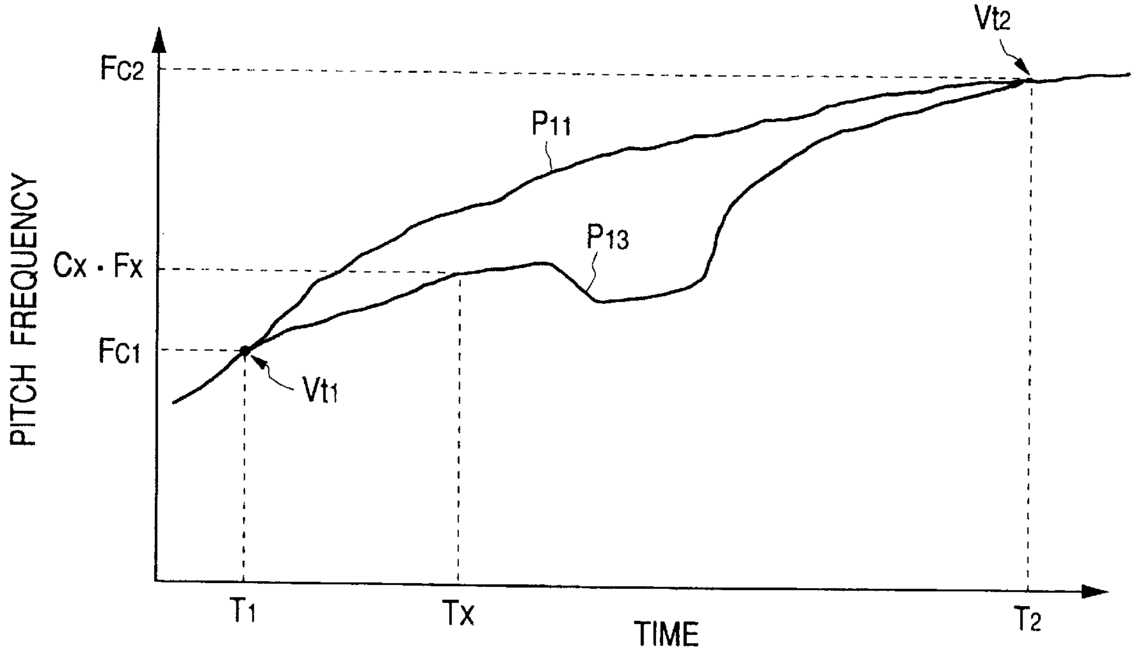
FIG. 5 shows a changed pitch pattern of a VCV phoneme-chain waveform overlapping with the VCV phoneme-chain portion of the composite pitch pattern P11.

FIG. 4 shows a VCV phoneme-chain portion of a composite pitch pattern P11 of a composite sound used as a standard of a pitch pattern of a synthesized sound and a pitch pattern P12 inherent in a VCV phoneme-chain waveform.

When a text in which digital characters are written is input, a composite pitch pattern P11 of an artificial waveform of a composite sound indicating the digital characters is artificially produced according to a well-known pitch pattern producing model of a regular voice synthesis. In the well known pitch pattern producing model, because the composite pitch pattern P11 is artificially produced, any pitch fluctuation or any pitch fine structure does not exist in the composite pitch pattern P11. However, an accent falling on the digital characters is considered in the composite pitch pattern P11, so that an accent component is included in the composite pitch pattern P11. For example, when a word "yokohama" is pronounced, an accent falls on phonemes "ko", "ha" and "ma", a pitch frequency of a phoneme "yo" in the word "yokohama" is lower than that of a phoneme "yo" generally pronounced by a speaker, and a pitch frequency of each of the phonemes "ko", "ha" and "ma" in the word "yokohama" is higher than that in a general pronunciation. Also, a difference between a pitch frequency of a phoneme in a phrase and a pitch frequency of a phoneme generally pronounced by a speaker is considered in the well known pitch pattern producing model, so that a phrase component is included in the composite pitch pattern P11.

Also, a pitch pattern P12 of a VCV (preceding vowel-consonant-succeeding vowel) phoneme-chain waveform corresponding to a VCV phoneme-chain portion of the composite pitch pattern P11 shown in FIG. 4 is produced from an actual voice sample. Because the pitch pattern P12 is produced from an actual voice sample, not only an accent component and a phrase component are included in the pitch pattern P12, but also a pitch fine structure and a pitch fluctuation exists in the pitch pattern P12.

As shown in FIG. 4, a pitch pattern is formed in a plane coordinate of a pitch frequency and a time, a transitional portion Vt1 of the preceding vowel is placed at a first time-point T1, and a transitional portion Vt2 of the succeeding vowel is placed at a second time-point T2. A pitch frequency of the pitch pattern P12 of the VCV phoneme-chain waveform at the first time-point T1 is F1, and a pitch frequency of the composite pitch pattern P11 used as a target of a pitch change is Fc1 at the first time-point T1. Also, a pitch frequency of the pitch pattern P12 at the second time-point T2 is F2, and a pitch frequency of the composite pitch pattern P11 at the first time-point T1 is Fc2.

In the present invention, the pitch pattern P12 corresponding to the VCV phoneme-chain portion of the composite pitch pattern P11 is selected from among five types. In detail, a low-high type VCV phoneme-chain waveform, a high—high type VCV phoneme-chain waveform, a high-low type VCV phoneme-chain waveform, a low—low type VCV phoneme-chain waveform and an exceptional type VCV phoneme-chain waveform are prepared for each VCV phoneme-chain portion of the composite pitch pattern P11.

In the low-high type VCV phoneme-chain waveform, a pitch frequency at the transitional portion Vt1 of the preceding vowel is lower than that at a transitional portion of the same vowel generally pronounced by a speaker, and a pitch frequency at the transitional portion Vt2 of the succeeding vowel is higher than that at a transitional portion of the same vowel generally pronounced by a speaker. In the high—high type VCV phoneme-chain waveform, a pitch frequency at the transitional portion Vt1 of the preceding vowel is higher than that at a transitional portion of the same vowel generally pronounced by a speaker, and a pitch frequency at the transitional portion Vt2 of the succeeding vowel is higher than that at a transitional portion of the same vowel generally pronounced by a speaker. In the high-low type VCV phoneme-chain waveform, a pitch frequency at the transitional portion Vt1 of the preceding vowel is higher than that at a transitional portion of the same vowel generally pronounced by a speaker, and a pitch frequency at the transitional portion Vt2 of the succeeding vowel is lower than that at a transitional portion of the same vowel generally pronounced by a speaker. In the low—low type VCV phoneme-chain waveform, a pitch frequency at the transitional portion of the Vt1 of the preceding vowel is lower than that at a transitional portion of the same vowel generally pronounced by a speaker, and a pitch frequency at the transitional portion Vt2 of the succeeding vowel is lower than that at a transitional portion of the same vowel generally pronounced by a speaker. A pitch pattern of the exceptional type VCV phoneme-chain waveform is selected when the VCV phoneme-chain portion of the composite pitch pattern P11 is placed at the top of a word or includes a voiceless vowel. In this embodiment, a pitch pattern of the low-high type VCV phoneme-chain waveform is selected as the pitch pattern P12 because a difference between a pitch frequency of the low-high type VCV phoneme-chain waveform and a pitch frequency of the composite pitch pattern P11 is smaller than any difference between a pitch frequency of another type VCV phoneme-chain waveform and the pitch frequency of the composite pitch pattern P11.

To synthesize a desired sound planned to be pronounced, it is required to change the pitch frequency F1 of the pitch pattern P12 to the pitch frequency Fc1 of the composite pitch pattern P11 and change the pitch frequency F2 of the pitch pattern P12 to the pitch frequency Fc2 of the composite pitch pattern P11. Therefore, a pitch changing coefficient C1 at the first time-point T1 is set to Fc1/F1 (Fc1>F1 for convenience) to change the pitch frequency F1 of the pitch pattern P12 to the pitch frequency Fc1 of the composite pitch pattern P11, and a pitch changing coefficient C2 at the second time-point T2 is set to Fc2/F2 (Fc2>F2 for convenience) to change the pitch frequency F2 of the pitch pattern P12 to the pitch frequency Fc2 of the composite pitch pattern P11. Also, a pitch changing coefficient Cx (Cx≧1 for convenience) of the pitch pattern P12 to the composite pitch pattern P11 at an arbitrary time-point Tx placed between the first and second time-points T1 and T2 is set as follows.

$$Cx=C1+(C2-C1)/(T2-T1)*(Tx-T1) \quad (1)$$

That is, a pitch frequency Fx of the pitch pattern P12 at the arbitrary time-point Tx is changed to a pitch frequency of Cx*Fx. Therefore, in case where an inclination of a straight line connecting the transitional portion Vt1 of the preceding vowel and the transitional portion Vt2 of the succeeding vowel is defined as an overall inclination of a pitch pattern, as shown in FIG. 5, an overall inclination of the pitch pattern P12 is changed to that of the composite pitch pattern P11, and a changed pitch pattern P13 having the pitch frequency of Cx*Fx is adopted as a pitch pattern of a changed VCV phoneme-chain waveform corresponding to the VCV phoneme-chain portion of the composite pitch pattern P11.

In cases where a plurality of VCV phoneme-chain waveforms correspond to the artificial waveform of the composite sound indicating the digital characters, a changed pitch pattern having a changed pitch frequency of Cx*Fx is prepared from each of pitch patterns of the VCV phoneme-chain waveforms, and the changed pitch patterns of the VCV phoneme-chain waveforms are connected with each other to overlap a transitional portion Vt1 of a succeeding vowel of one particular VCV phoneme-chain waveform with a transitional portion Vt1 of a preceding vowel of a VCV phoneme-chain waveform following the particular VCV phoneme-chain waveform for each VCV phoneme-chain waveform, and a synthesized waveform of a synthesized sound having a synthesized pitch pattern obtained by connecting the changed pitch patterns of the VCV phoneme-chain waveforms with each other is obtained.

Accordingly, a pitch frequency of a VCV phoneme-chain waveform can be changed while maintaining a pitch fluctuation of the VCV phoneme-chain waveform and a pitch fine structure of the VCV phoneme-chain waveform even though a pitch changing degree for the VCV phoneme-chain waveform is high.

Next, an apparatus of synthesizing a sound from a plurality of VCV phoneme-chain waveforms performed according to the pitch changing method of the VCV phoneme-chain waveform is described with reference to FIG. 6.

Figure 6:
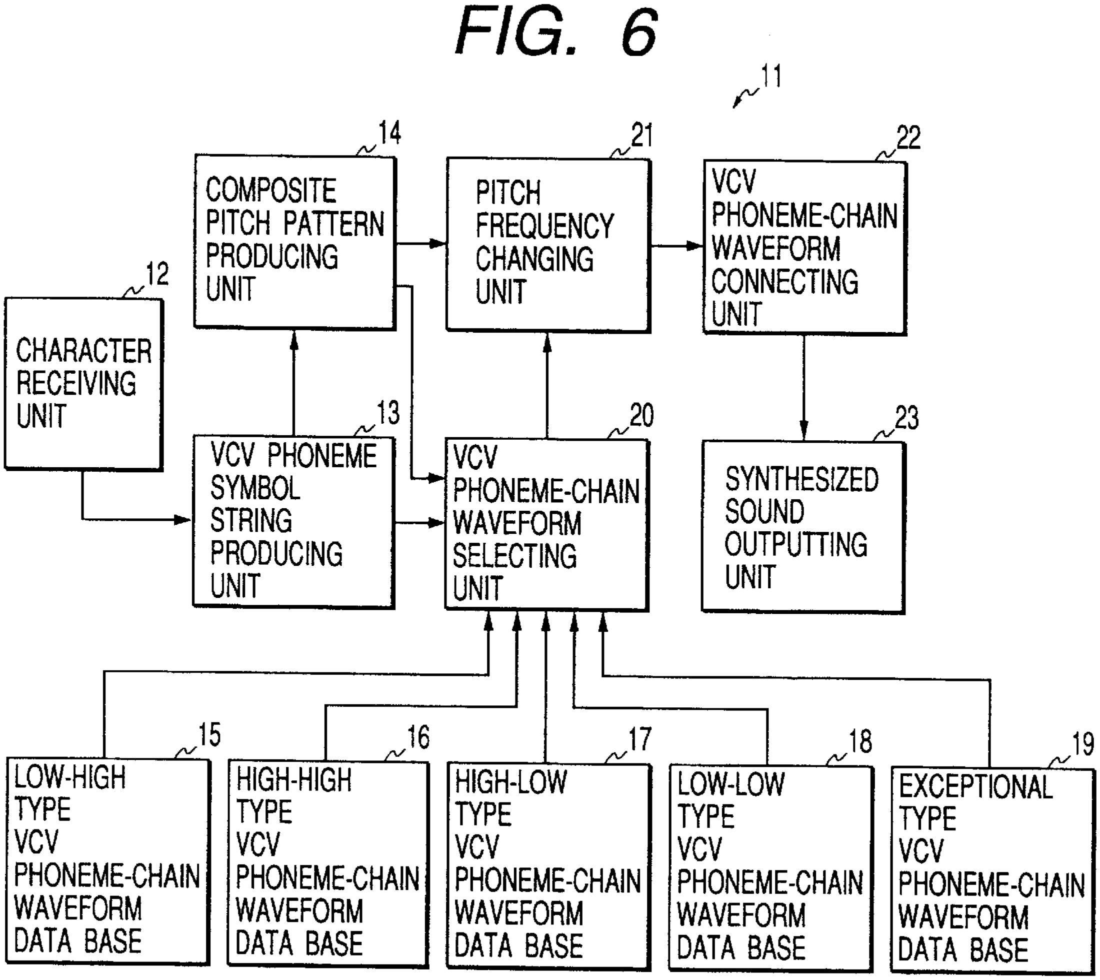
FIG. 6 is a block diagram of a sound synthesizing apparatus according to an embodiment of the present invention.

FIG. 6 is a block diagram of a sound synthesizing apparatus according to an embodiment of the present invention.

As shown in FIG. 6, a sound synthesizing apparatus 11 comprises a character receiving unit 12 for receiving characters (for example, "yokohamashi") written in a text and converting the characters into a character signal;

a VCV phoneme symbol string producing unit 13 for producing a string of VCV phoneme-chain symbols (for example, "yo", "oko", "oha", "ama" and "ashi") corresponding to the characters from the character signal;

a composite pitch pattern producing unit 14 for producing a composite pitch pattern of a composite sound corresponding to the characters from the string of VCV phoneme-chain symbols according to a conventional pitch pattern producing model, the composite pitch pattern of a composite sound including no pitch fine structure or no pitch fluctuation;

a low-high type VCV phoneme-chain waveform data base 15 for storing a large number of low-high type VCV phoneme-chain waveforms produced from actual voice samples, each low-high type VCV phoneme-chain waveform including a pitch fine structure and a pitch fluctuation;

a high—high type VCV phoneme-chain waveform data base 16 for storing a large number of high-high type VCV phoneme-chain waveforms produced from actual voice samples, each high—high type VCV phoneme-chain waveform including a pitch fine structure and a pitch fluctuation;

a high-low type VCV phoneme-chain waveform data base 17 for storing a large number of high-low type VCV phoneme-chain waveforms produced from actual voice samples, each high-low type VCV phoneme-chain waveform including a pitch fine structure and a pitch fluctuation;

a low—low type VCV phoneme-chain waveform data base 18 for storing a large number of low-low type VCV phoneme-chain waveforms produced from actual voice samples, each low—low type VCV phoneme-chain waveform including a pitch fine structure and a pitch fluctuation;

an exceptional type VCV phoneme-chain waveform data base 19 for storing a large number of exceptional type VCV phoneme-chain waveforms produced from actual voice samples, each exceptional type VCV phoneme-chain waveform including a pitch fine structure and a pitch fluctuation;

a VCV phoneme-chain waveform selecting unit 20 for extracting one low-high type VCV phoneme-chain waveform, one high—high type VCV phoneme-chain waveform, one high-low type VCV phoneme-chain waveform, one low—low type VCV phoneme-chain waveform and one exceptional type VCV phoneme-chain waveform corresponding to one VCV phoneme-chain symbol produced by the VCV phoneme symbol string producing unit 13 from the data bases 15 to 19 as candidates for each VCV phoneme-chain symbol and selecting a particular VCV phoneme-chain waveform from among the candidates, on condition that a particular pitch changing coefficient Cx of a pitch pattern of the particular VCV phoneme-chain waveform to a VCV phoneme-chain portion of the composite pitch pattern corresponding to the VCV phoneme-chain symbol is smallest (or nearest to 1) among pitch changing coefficients Cx of pitch patterns of the candidates, for each VCV phoneme-chain symbol;

a pitch frequency changing unit 21 for changing a pitch frequency of the particular VCV phoneme-chain waveform selected by the VCV phoneme-chain waveform selecting unit 20 by multiplying the pitch frequency by the particular pitch changing coefficient Cx according to the pitch changing method to make an overall inclination of the pitch pattern of the particular VCV phoneme-chain waveform agree with an overall inclination of the VCV phoneme-chain portion of the composite pitch pattern and producing a changed pitch pattern of the particular VCV phoneme-chain waveform for each VCV phoneme-chain symbol;

a VCV phoneme-chain waveform connecting unit 22 for connecting the changed pitch patterns of the particular VCV phoneme-chain waveforms corresponding to the string of VCV phoneme-chain symbols while overlapping a transitional portion Vt1 of a succeeding vowel of a first particular VCV phoneme-chain waveform with a transitional portion Vt1 of a preceding vowel of a second particular VCV phoneme-chain waveform following the first particular VCV phoneme-chain waveform for each particular VCV phoneme-chain waveform to produce a synthesized pitch pattern of a synthesized waveform of a synthesized sound in which a pitch fine structure and a pitch fluctuation are maintained; and a synthesized sound outputting unit 23 for outputting the synthesized sound produced by the VCV phoneme-chain waveform connecting unit 22.

Figure 7:
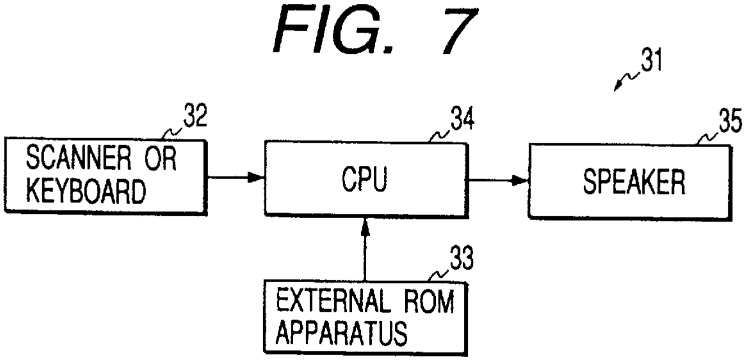
FIG. 7 is a block diagram of a computer system used to perform an operation of the sound synthesizing apparatus 11.

FIG. 7 is a block diagram of a computer system used to perform an operation of the sound synthesizing apparatus 11.

As shown in FIG. 7, a computer system 31 comprises a scanner or keyboard 32, an external ROM apparatus 33, a central processing unit (CPU) 34 and a speaker 35. The operation of the character receiving unit 12 is realized by the scanner or keyboard 32. In cases where the scanner 32 is used, characters written in a text are recognized and converted into a character signal. In cases where the keyboard 32 is used, a user inputs characters written in a text to the keyboard 32, and the input characters are converted into a character signal. The external ROM apparatus 33 functions as the data bases 15 to 19. The operation in the VCV phoneme symbol string producing unit 13, the composite pitch pattern producing unit 14, the VCV phoneme-chain waveform selecting unit 20 , the pitch frequency changing unit 21 and the VCV phoneme-chain waveform connecting unit 22 is performed by the CPU 35. The operation of the synthesized sound outputting unit 23 is performed by the speaker 35. Therefore, a user can hear the synthesized sound.

In the above configuration, an operation of the sound synthesizing apparatus 11 is described.

Five types of VCV phoneme-chain waveforms corresponding to the same VCV phoneme chain are produced from actual voice samples for each VCV phoneme chain, and a large number of VCV phoneme-chain waveforms are stored in advance in each of the data bases 15 to 16.

When a user inputs characters "yokohamashi" written in a text to the character receiving unit 12, a string of VCV phoneme-chain symbols "yo", "oko", "oha", "ama" and "ashi" corresponding to the characters is produced in the VCV phoneme symbol string producing unit 13. In the string of VCV phoneme-chain symbols, a CV phoneme-chain symbol "yo" is included. Thereafter, a composite pitch pattern of a composite sound corresponding to the characters is produced from the string of VCV phoneme-chain symbols according to a general pitch pattern producing model in the composite pitch pattern producing unit 14. In this case, each VCV phoneme-chain symbol corresponds to one VCV phoneme-chain portion of the composite pitch pattern. Therefore, a pitch pattern of a sound corresponding to the characters is roughly obtained. However, because the composite pitch pattern is artificially generated, the composite pitch pattern is used as a rough standard of a desired pitch pattern of a sound corresponding to the characters.

Also, in the VCV phoneme-chain waveform selecting unit 20, one low-high type VCV phoneme-chain waveform, one high—high type VCV phoneme-chain waveform, one high-low type VCV phoneme-chain waveform, one low—low type VCV phoneme-chain waveform and one exceptional type VCV phoneme-chain waveform corresponding to one VCV phoneme-chain symbol (including a CV phoneme-chain symbol) are extracted as candidates for a desired VCV phoneme-chain waveform from the VCV phoneme-chain waveform data bases 15 to 19, and a particular VCV phoneme-chain waveform is selected from among the candidates on condition that a particular pitch changing coefficient Cx determined to arrange a pitch pattern of the particular VCV phoneme-chain waveform along a VCV phoneme-chain portion of the composite pitch pattern corresponding to the VCV phoneme-chain symbol is smallest (or nearest to 1) among pitch changing coefficients for pitch patterns of the candidates. The selection of the particular VCV phoneme-chain waveform is performed for each VCV phoneme-chain symbol. For example, a particular CV phoneme-chain waveform for the CV phoneme-chain symbol "yo" is selected from the exceptional type VCV phoneme-chain waveform data base.

Thereafter, in the pitch frequency changing unit 21, the particular pitch changing coefficient Cx for one particular VCV phoneme-chain waveform corresponding to one VCV phoneme-chain symbol is calculated according to the equation (1) of the pitch changing method, and a pitch frequency of the particular VCV phoneme-chain waveform is multiplied by the particular pitch changing coefficient Cx to produce a changed pitch frequency. Therefore, an overall inclination of the changed pitch pattern of the particular VCV phoneme-chain waveform agrees with an overall inclination of a VCV phoneme-chain portion of the composite pitch pattern corresponding to the VCV phoneme-chain symbol. The changed pitch frequency of the particular VCV phoneme-chain waveform is produced for each VCV phoneme-chain symbol.

Thereafter, in the VCV phoneme-chain waveform connecting unit 22, the changed pitch patterns of the particular VCV phoneme-chain waveforms corresponding to the string of VCV phoneme-chain symbols are connected with each other in that order. In this case, a transitional portion Vt2 of a succeeding vowel of a first particular VCV phoneme-chain waveform overlaps with a transitional portion Vt1 of a preceding vowel of a second particular VCV phoneme-chain waveform following the first particular VCV phoneme-chain waveform for each particular VCV phoneme-chain waveform. Therefore, a synthesized pitch pattern of a synthesized waveform of a synthesized sound is produced. Thereafter, the synthesized sound is output.

Accordingly, because a particular pitch changing coefficient Cx for one particular VCV phoneme-chain waveform corresponding to one VCV phoneme-chain symbol is calculated according to the equation (1) of the pitch changing method and a pitch frequency of the particular VCV phoneme-chain waveform is changed to make an overall inclination of the pitch frequency of the particular VCV phoneme-chain waveform agree with an overall inclination of a VCV phoneme-chain portion of the composite pitch pattern corresponding to the VCV phoneme-chain symbol, when the change of the pitch frequency of the particular VCV phoneme-chain waveform is performed for each VCV phoneme-chain symbol, a synthesized sound of the input characters can be obtained while maintaining a pitch fluctuation and a pitch fine structure in a synthesized waveform of the synthesized sound, even though a pitch changing degree for each VCV phoneme-chain waveform is high.

Also, because each particular VCV phoneme-chain waveform is selected from among five types of VCV phoneme-chain waveforms on condition that a particular pitch changing coefficient Cx for the particular VCV phoneme-chain waveform is smallest (or nearest to 1), the pitch changing degree for each VCV phoneme-chain waveform can be minimized, and the-pitch fluctuation and the pitch fine structure in the synthesized waveform of the synthesized sound can be moreover maintained. That is, the synthesized sound superior to the natural quality can be obtained.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A pitch changing method of a VCV phoneme-chain waveform, comprising the steps of:

producing a composite pitch pattern of an artificial waveform of a composite sound indicating characters written in a text, the composite pitch pattern being drawn in plane co-ordinates of a pitch frequency and a time;

specifying a VCV phoneme-chain portion of the composite pitch pattern corresponding to a VCV phoneme chain composed of a preceding vowel, a consonant and a succeeding vowel;

producing a pitch pattern of a VCV phoneme-chain waveform of the VCV phoneme chain from an actual voice sample;

defining an inclination of a straight line connecting a transitional portion of the preceding vowel and a transitional portion of the succeeding vowel in the plane co-ordinates as an overall inclination of a pitch pattern of a waveform corresponding to the VCV phoneme chain;

changing a pitch of the VCV phoneme-chain waveform to form a changed pitch pattern of the VCV phoneme-chain waveform while making the overall inclination of the changed pitch pattern of the VCV phoneme-chain waveform agree with the overall inclination of the VCV phoneme-chain portion of the composite pitch pattern and overlapping the transitional portion of the preceding vowel in the changed pitch pattern of the VCV phoneme-chain waveform with that in the VCV phoneme-chain portion of the composite pitch pattern; and adopting the changed pitch pattern of the VCV phoneme-chain waveform as a pitch pattern of a waveform corresponding to the VCV phoneme chain.

2. A pitch changing method according to claim 1 in which the step of producing a pitch pattern of a VCV phoneme-chain waveform comprises the steps of:

producing a pitch pattern of a low-high type VCV phoneme-chain waveform of the VCV phoneme chain, in which a pitch frequency at a transitional portion of the preceding vowel is low and a pitch frequency at a transitional portion of the succeeding vowel is high, from an actual voice sample;

producing a pitch pattern of a high-high type VCV phoneme-chain waveform of the VCV phoneme chain, in which a pitch frequency at a transitional portion of the preceding vowel is high and a pitch frequency at a transitional portion of the succeeding vowel is high, from an actual voice sample;

producing a pitch pattern of a high-low type VCV phoneme-chain waveform of the VCV phoneme chain, in which a pitch frequency at a transitional portion of the preceding vowel is high and a pitch frequency at a transitional portion of the succeeding vowel is low, from an actual voice sample;

producing a pitch pattern of a low—low type VCV phoneme-chain waveform of the VCV phoneme chain, in which a pitch frequency at a transitional portion of the preceding vowel is low and a pitch frequency at a transitional portion of the succeeding vowel is low, from an actual voice sample;

producing a pitch pattern of an exceptional type VCV phoneme-chain waveform of the VCV phoneme chain, which is placed at the top of a word or includes a voiceless vowel, from an actual voice sample; and selecting a particular pitch pattern of one type VCV phoneme-chain waveform as the pitch pattern of the VCV phoneme-chain waveform of the VCV phoneme chain from among the pitch patterns of the low-high type VCV phoneme-chain waveform, the high—high type VCV phoneme-chain waveform, the high-low type VCV phoneme-chain waveform, the low—low type VCV phoneme-chain waveform and the exceptional type VCV phoneme-chain waveform on condition that a difference in the pitch frequency between the particular pitch pattern and the VCV phoneme-chain portion of the composite pitch pattern is the smallest.

3. A pitch changing method according to claim 1 in which the step of changing a pitch of the VCV phoneme-chain waveform includes the steps of:

calculating a first ratio of a pitch frequency Fc1 of the composite pitch pattern to a pitch frequency F1 of the pitch pattern of the VCV phoneme-chain waveform at a first time-point T1;

calculating a second ratio of a pitch frequency Fc2 of the composite pitch pattern to a pitch frequency F2 of the pitch pattern of the VCV phoneme-chain waveform at a second time-point T2;

setting the first ratio Fc1/F1 to a pitch changing coefficient C1 at the first time-point T1;

setting the second ratio Fc2/F2 to a pitch changing coefficient C2 at the second time-point T2;

calculating a pitch changing coefficient Cx at an arbitrary time-point Tx as follows $$Cx=C1+(C2-C1)/(T2-T1)*(Tx-T1);$$ and multiplying a pitch frequency of the pitch pattern of the VCV phoneme-chain waveform by the pitch changing coefficient Cx to form the changed pitch pattern of the VCV phoneme-chain waveform.

4. A sound synthesizing apparatus comprising:

storing means for storing a large number of VCV phoneme-chain waveforms of VCV phoneme-chains produced from actual voice samples, each VCV phoneme-chain being composed of a preceding vowel, a consonant and a succeeding vowel;

receiving means for receiving characters written in a text;

VCV phoneme-chain determining means for determining a string of particular VCV phoneme-chains corresponding to the characters received by the receiving means;

composite pitch pattern producing means for producing a composite pitch pattern of an artificial waveform of a composite sound corresponding to the characters according to the string of particular VCV phoneme-chains determined by the VCV phoneme-chain determining means;

VCV phoneme-chain waveform selecting means for selecting a series of particular VCV phoneme-chain waveforms corresponding to the string of particular VCV phoneme-chains determined by the VCV phoneme-chain determining means from the VCV phoneme-chain waveforms stored in the storing means;

pitch changing means for changing a pitch of each particular VCV phoneme-chain waveform selected by the VCV phoneme-chain waveform selecting means to form a changed pitch pattern of the particular VCV phoneme-chain waveform while making an overall inclination of the changed pitch pattern of the particular VCV phoneme-chain waveform agree with an overall inclination of a portion of the composite pitch pattern produced by the composite pitch pattern producing means and overlapping a transitional portion of the preceding vowel in the changed pitch pattern of the particular VCV phoneme-chain waveform with that in the portion of the composite pitch pattern;

VCV phoneme-chain waveform connecting means for connecting the changed pitch patterns of the particular VCV phoneme-chain waveforms obtained by the pitch changing means with each other while overlapping a transitional portion of a succeeding vowel of a first particular VCV phoneme-chain waveform with a transitional portion of a preceding vowel of a second particular VCV phoneme-chain waveform following the first particular VCV phoneme-chain waveform for each particular VCV phoneme-chain waveform to produce a synthesized pitch pattern of a synthesized waveform of a synthesized sound; and synthesized sound outputting means for outputting the synthesized sound produced by the VCV phoneme-chain waveform connecting means.

5. A sound synthesizing apparatus according to claim 4 in which the storing means comprises:

a low-high type VCV phoneme-chain waveform data base for storing a large number of low-high type VCV phoneme-chain waveforms, in which a pitch frequency at a transitional portion of the preceding vowel in each low-high type VCV phoneme-chain waveform is low and a pitch frequency at a transitional portion of the succeeding vowel in each low-high type VCV phoneme-chain waveform is high, from actual voice samples;

a high—high type VCV phoneme-chain waveform data base for storing a large number of high—high type VCV phoneme-chain waveforms, in which a pitch frequency at a transitional portion of the preceding vowel in each high—high type VCV phoneme-chain waveform is high and a pitch frequency at a transitional portion of the succeeding vowel in each high—high type VCV phoneme-chain waveform is high, from actual voice samples;

a high-low type VCV phoneme-chain waveform data base for storing a large number of high-low type VCV phoneme-chain waveforms, in which a pitch frequency at a transitional portion of the preceding vowel in each high-low type VCV phoneme-chain waveform is high and a pitch frequency at a positional portion of the succeeding vowel in each high-low type VCV phoneme-chain waveform is low, from actual voice samples;

a low—low type VCV phoneme-chain waveform data base for storing a large number of low—low type VCV phoneme-chain waveforms; in which a pitch frequency at a transitional portion of the preceding vowel in each high-low type VCV phoneme-chain waveform is low and a pitch frequency at a transitional portion of the succeeding vowel in each low—low type VCV phoneme-chain waveform is low, from actual voice samples; and an exceptional type VCV phoneme-chain waveform data base for storing a large number of exceptional type VCV phoneme-chain waveforms of the VCV phoneme chains, which are respectively placed at the top of a word or include a voiceless vowel, from actual voice samples, a particular low-high type VCV phoneme-chain waveform, a particular high—high type VCV phoneme-chain waveform, a particular high-low type VCV phoneme-chain waveform, a particular low—low type VCV phoneme-chain waveform and a particular exceptional type VCV phoneme-chain waveform corresponding to each particular VCV phoneme-chain are extracted by the VCV phoneme-chain waveform selecting means from the low-high type VCV phoneme-chain waveform data base, the high—high type VCV phoneme-chain waveform data base, the high-low type VCV phoneme-chain waveform data base an the low exceptional type VCV phoneme-chain waveform data base, and one particular type VCV phoneme-chain waveform is selected by the VCV phoneme-chain waveform selecting means as one particular VCV phoneme-chain waveform corresponding to each particular VCV phoneme-chain from among the particular low-high type VCV phoneme-chain waveform; the particular high—high type VCV phoneme-chain waveform, the particular high-low type VCV phoneme-chain waveform, the particular low—low type VCV phoneme-chain waveform and the particular exceptional type VCV phoneme-chain waveform on condition that a difference in the pitch frequency between the particular type VCV phoneme-chain waveform and a corresponding portion of the composite pitch pattern is the smallest.

6. A sound synthesizing apparatus according to claim 4 in which the pitch changing means includes pitch changing coefficient calculating means for calculating a first ratio of a pitch frequency Fc1 of the composite pitch pattern to a pitch frequency F1 of the pitch pattern of the VCV phoneme-chain waveform at a first time-point T1, calculating a second ratio of a pitch frequency Fc2 of the composite pitch pattern to a pitch frequency F2 of the pitch pattern of the VCV phoneme-chain waveform at a second time-point T2, setting the first ratio Fc1/F1 to a pitch changing coefficient C1 at the first time-point T1, setting the second ratio Fc2/F2 to a pitch changing coefficient C2 at the second time-point T2, and calculating a pitch changing coefficient Cx at an arbitrary time-point Tx as follows $$Cx=C1+(C2-C1)/(T2T1)*(Tx-T1);$$ and changed pitch pattern forming means for multiplying a pitch frequency of the pitch pattern of the VCV phoneme-chain waveform by the pitch changing coefficient Cx calculated by the pitch changing coefficient calculating means to form the changed pitch pattern of the VCV phoneme-chain waveform.

* * * * *